United States Patent [19]

McCall

[11] Patent Number: 4,812,049
[45] Date of Patent: Mar. 14, 1989

[54] FLUID DISPERSING MEANS

[76] Inventor: Floyd McCall, 26031 Dumont Rd., Hemet, Calif. 92344

[21] Appl. No.: 897,260

[22] Filed: Aug. 18, 1986

Related U.S. Application Data

[63] Continuation-in-part of Ser. No. 649,512, Sep. 11, 1984, Pat. No. 4,638,672.

[51] Int. Cl.$^4$ ............................................. B01F 5/04
[52] U.S. Cl. .................................. 366/174; 48/180.1; 261/76
[58] Field of Search ............... 366/101, 167, 173, 174, 366/176, 336, 338, 340; 261/76, 77, 78.1, 78.2; 138/40; 48/180.1, 189.4; 239/429, 430, 431, 434.5; 60/737; 137/896; 431/217, 245, 354

[56] References Cited

U.S. PATENT DOCUMENTS

| | | | |
|---|---|---|---|
| 613,093 | 10/1898 | Tyson | 261/76 X |
| 1,000,385 | 8/1911 | Eberle | 48/189.4 |
| 1,454,196 | 5/1923 | Trood | 48/189.4 |
| 1,535,702 | 4/1925 | Walsh et al. | 48/189.4 X |
| 1,942,293 | 1/1934 | Kane | 48/180.1 |
| 2,021,092 | 11/1935 | Teliet | 366/174 |
| 2,068,567 | 1/1937 | Palmer | 48/180.1 |
| 2,595,720 | 5/1952 | Snyder | 261/50.2 |
| 2,805,966 | 9/1957 | Etheridge | 261/78.2 X |
| 3,143,401 | 8/1964 | Lambrecht | 48/180.1 |
| 3,376,023 | 4/1968 | Lage | 366/174 |
| 3,671,025 | 6/1972 | Elliott | 261/76 |
| 3,675,901 | 7/1972 | Rion | 366/178 |
| 3,968,932 | 7/1976 | Kimmell | 239/430 X |
| 4,051,204 | 9/1977 | Muller et al. | 366/101 |
| 4,275,841 | 6/1981 | Takeyama et al. | 239/431 |
| 4,299,655 | 11/1981 | Skaugen | 366/101 X |
| 4,522,151 | 6/1985 | Arbisi et al. | 261/76 X |

Primary Examiner—Harvey C. Hornsby
Assistant Examiner—Scott J. Haugland
Attorney, Agent, or Firm—Bruno J. Verbeck; Thomas R. Juettner

[57] ABSTRACT

An improved device for mixing and/or dispersing fluids, and useful as a component of fuel injectors, carburetors, oil burners, de-superheaters and gas coolers, and in the production of foams and emulsions.

12 Claims, 2 Drawing Sheets

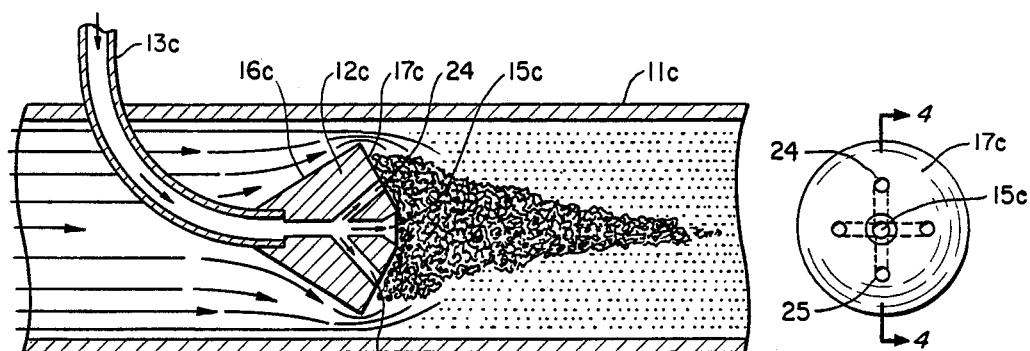
FIG. 4
FIG. 7
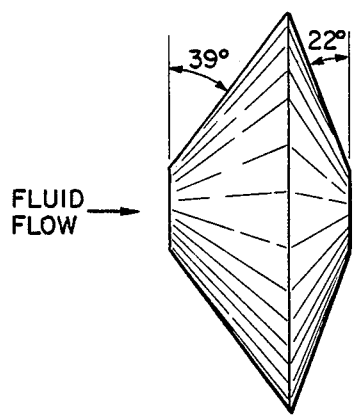
FIG. 5

FLUID DISPERSING MEANS

CROSS REFERENCE

This application is a continuation-in-part of my earlier application, Ser. No. 06/649,512, filed Sept. 11, 1984 (now U.S. Pat. No. 4,638,672).

1. Technical Field

This invention relates to improvements in devices used to mix, and/or disperse, fluids. More particularly it is directed to improved components of such mixing devices which components are incorporated into a mixing system wherein various kinds of fluids including liquids and gases pass through a conduit or conduits and around and through said components and are subjected to turbulent mixing.

2. Background Art

Various devices and systems have been described in the prior art for mixing fluids by means of static, or motionless, mixers. Thus, U.S. Pat. No. 3,671,025 to Elliott describes a fluid mixing device for oil burner use which comprises an outer cylindrical, tubular member and an inner cylindrical tubular member provided with a flared bell at one end thereof. The outer lip of the bell has a diameter which defines a narrow annular venturi orifice in relationship to the outer tubular member. Air which flows in the outer tubular member draws oil from the inner tubular member resulting in the production of a finely mixed fog beyond the flared bell. While the mixing achieved with the device described in this patent is adequate for some purposes, the degree of turbulence and of intimate mixing of the fluids is not entirely satisfactory.

U.S. Pat. No. 4,522,151 to Arbisi et al. describes an aerator nozzle which includes a combined air and liquid discharge nozzle unit which is supplied, respectively, from an air compressor and a liquid pump, the nozzle unit including a liquid discharge nozzle with an air dispersing nozzle therewithin. Though simple in construction, this device does not provide the degree of controlled turbulence necessary to effect a wholly satisfactory degree of mixing.

Still another patent, U.S. Pat. No. 3,675,901 to Rion, describes an apparatus for delivering a plurality of materials to form an emulsion. The device includes a first conduit with a chamber coaxially connected to a line, a second conduit extending from adjacent the first conduit to a coaxial location within the first conduit for injecting a material into a mixing chamber. Again there is no substantial turbulence occurring with this apparatus, such as is necessary to achieve the highest degree of controlled mixing of fluids.

Other prior art fluid mixers include, for example, those described in U.S. Pat. No. 3,143,401 to Lambrecht which is directed to a fuel injector, and in U.S. Pat. No. 2,595,720 to Snyder, describing a carburetor. Still another patent, U.S. Pat. No. 4,299,655, for a foam generator for paper making machines, describes a unit for dispersing and mixing fluids in which a device for the purpose is provided with a flow path including an upstream conduit, a downstream conduit, and a housing therebetween, which defines a dispersing and mixing chamber having a plug which provides venturi chambers, and a washboard corrugated path on the upstream side.

None of the prior art above-described, or any other art of which the applicant is aware, discloses his invention, which will be described in full detail hereinafter.

DESCRIPTION OF THE INVENTION

In patent application Ser. No. 06/649,512, filed Sept. 11, 1984, of which this is a continuation-in-part, there is disclosed a device in the form of two frustums, joined at their widest ends, mounted in a conduit. The sloped walls of the device deflect fluid flowing through said conduit through a region defined by the periphery of the device and the interior surface portion of the conduit proximate the periphery, effecting linearization of the velocity profile of fluid flowing through the conduit. That device, equipped with a second conduit means transversely therethrough, can be used to pass a second fluid through the second conduit, to effect controlled turbulence downstream of said device and result in an intimate mixing of the fluids, as will be fully described hereinafter.

Other uses and advantages will be obvious or become apparent from a consideration of the following detailed description and the application drawings in which like reference numerals indicate like parts throughout the several views.

DESCRIPTION OF THE DRAWINGS

FIG. 1 to 4 are views in cross section of embodiments of my invention, in each of which the fluid dispersing member has one or more passageways or conduits for conducting a fluid therethrough and into one or more outlets variously positioned on the dispersing member;

FIG. 5 is a side view of the dispersing element shown in FIG. 1;

FIG. 6 is an end view of element 12b of FIG. 3, looking upstream;

FIG. 7 is an end view of element 12c of FIG. 4, looking upstream.

EMBODIMENTS ILLUSTRATING BEST MODE FOR CARRYING OUT THE INVENTION

Figure 1:
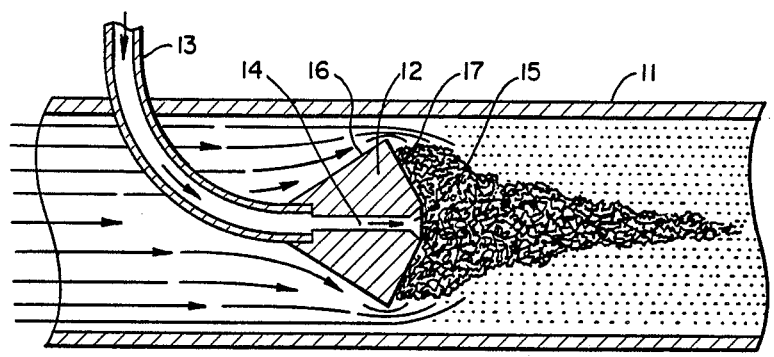

Referring to FIG. 1, there is shown a conduit or pipe 11 within which a fluid-dispersing element 12 is positioned coaxially. In use, conduit 11 is provided with a supply of fluid flowing from left to right, the movement being generated by any suitable means as by a pump or the like (not shown).

Dispersing element 12, which may be of metal, plastic, or the like, is secured threadably, or otherwise, to a conduit 13, passing through, and preferably secured to, the wall of conduit 11, and is in the form of two frustums joined together at their wide ends, the diameters of said wide ends being substantially equal, as shown.

Element 12 is also provided with a passageway 14 therethrough, to permit the movement therethrough of a second fluid, coming from conduit 13, and which is to be mixed with fluid flowing through conduit 11. The fluid passing through conduit 13 moves in the direction shown as a result of pressure applied by a pump or the like (not shown). Dispersing element 12 is mounted substantially normal to the direction of fluid flow in conduit 11, and, being of a diameter which is smaller than the inner diameter of conduit 11, the fluid is caused to flow through the region defined by the periphery of element 12 and the inner surface of conduit 11 which is proximate said periphery. By the statement that "Dispersing element 12 is mounted substantially normal to the direction of fluid flow", as used herein, I mean that element 12 is positioned so that a plane passing through the diameter of element 12 is substantially normal to the fluid moving through conduit 11, as shown in the drawings. Element 12 may have its sloped wall portion 16, which extends upstream, of such a length that its extension in that direction is greater than the length of its sloped wall 17 which extends downward, i.e., into the downstream side. Element 12 may be mounted coaxially within conduit 11 by brackets (not shown), or the like, or, alternatively conduit 13, to which element 12 is secured, may itself be firmly secured, in a fluid tight manner, to the wall of conduit 11 through which it passes. As shown in FIG. 1, the fluid passing through conduit 13 and then into passageway 14 is introduced, through opening 15 into the fluid flowing from left to right in conduit 11, in a zone downstream from dispersing element 12, where violent turbulence occurs, providing intimate mixing of the two fluids.

Figure 2:
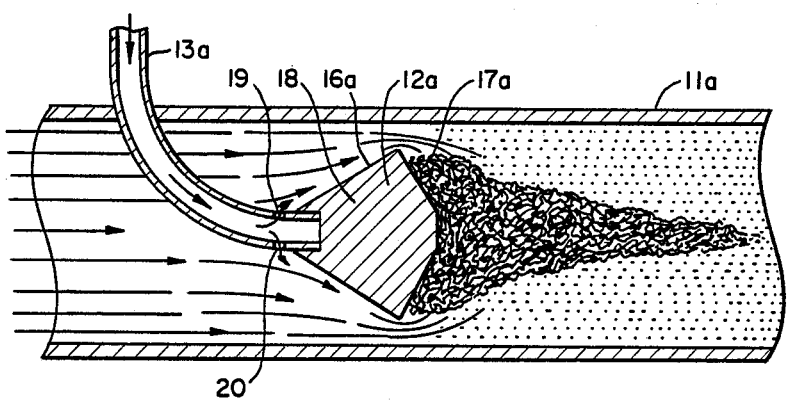

The embodiment shown in FIG. 2 differs from that in FIG. 1 essentially in that, instead of a port, or opening 15 positioned at the end of a passageway 14 in dispersing element 12a through which a fluid flows through conduit 13a, there are ports 19 and 20 in conduit 13a, located near the juncture of element 12a and conduit 13a, to permit fluid flowing through conduit 13a to emerge from ports 19 and 20, into the fluid flowing through conduit 11a, and thereby effect some commingling of the fluids in the region around sloped wall 16a before the commingled fluids pass between the widest diameter of element 12a and the inner wall of conduit 11, and are turbulently mixed in the region shown at the downstream end of element 12a. While only two ports, 19 and 20, are indicated, it will be understood that additional ports are contemplated and included within the scope of my invention.

Figures 3, 6:
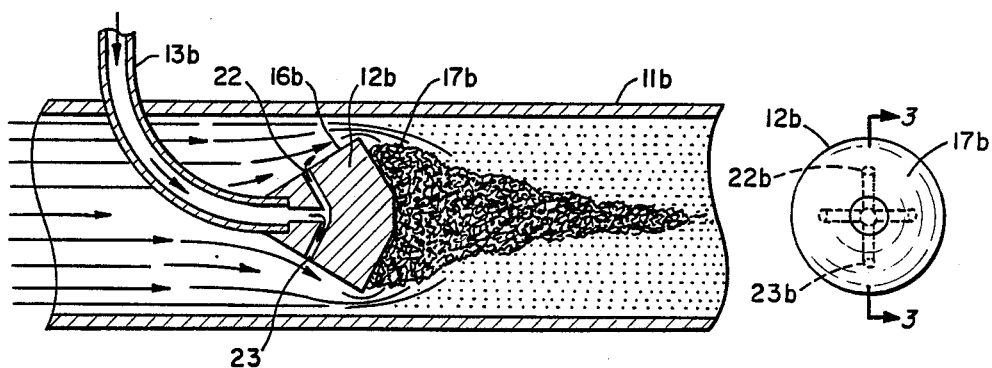

The embodiment shown in FIG. 3 differs essentially from those which are illustrated in FIGS. 1 and 2, in the positioning of the ports through which fluid flowing through conduit 13b, enters part way into the body of element 12b, as shown in the drawing, and is then discharged through ports 22 and 23 which are located in the upstream wall portion 16b of element 12b, that fluid then being picked up by the fluid flowing from left to right through conduit 11b, around the periphery of element 12b and into the region or zone from the downstream wall portion 17b, for intimate and turbulent mixing. While there are shown two ports, 22 and 23, it will again be understood that any number of ports may be present, as needed or desired, depending on the viscosity of the fluids, velocity of the fluids, and other factors, as those skilled in the art will appreciate.

The embodiment illustrated in FIG. 4 is similar to that in FIG. 1, except that in addition to port 15c (15 in FIG. 1) there are additional ports 24 and 25 positioned in element 12c, in the downstream portion of the sloped wall 17c. As in the preceeding embodiments, the fluid flowing from left to right through conduit 11c flows around the sloped wall portion 16c of element 12c and is mixed with fluid flowing through conduit 13c and emanating from ports 24, 25, and 15c, where both fluids are intimately and turbulently mixed, in the region adjacent the downstream wall portion 17c, of element 12c, as shown.

One embodiment of dispersing element 12, shown in side view in FIG. 5, has, illustratively an upstream-side sloped wall angle of 39°, and a downstream-side sloped wall angle of 22°. The former angle may vary from about 39° to about 75°, preferably about 67.5° and the latter from about 0° to 26°, preferably about 26°.

While the size of dispersing element 12 may vary widely, the relationship between the inner diameter of conduit 11 and the largest diameter of element 12 shown as positioned in FIG. 1 is preferably such that the Beta number is between about 0.3 and 0.94. The Beta number is defined as follows:

$$\text{Beta} = (D^2 - d^2)^{\frac{1}{2}}/D$$

where D is the inner diameter of conduit 11 and d is the diameter of element 12.

My invention is particularly useful as a component of fuel injectors, and carburetors for combustion engines, in oil burners, for mixing liquids with liquids and liquids with gases, and in the production of foams and emulsions, and as a component of de-superheaters and gas coolers.

While there are shown and described preferred embodiments of my invention, it will be obvious to those skilled in the art that changes and modification may be made without departing from the broader aspects of my invention. It is therefore intended that the appended claims cover such changes and modifications as fall within the scope of my invention.

I claim:

1. A fluid mixing device comprising:
   (a) a conduit having a central axis and a uniform internal configuration for conveying a first fluid therethrough in a predetermined direction;
   (b) a fluid dispersing member of smaller size than said conduit and having a passage therein for discharging a second fluid into said first fluid;
   (c) said fluid dispersing member consisting essentially of two frustums joined at their larger ends and mounted coaxially within said conduit substantially normal to the direction of fluid flow through said conduit and with their peripheries spaced symmetrically inwardly from said conduit;
   (d) the sloped wall of the joined frustums facing in the downstream direction extending inwardly to adjacent the axis of said conduit at an angle in the order of about 22° to the plane defined by the periphery of the joined ends of said frustums, and terminating in a flat face parallel to said plane;
   (e) said joined frustums causing the fluid flowing therearound through said conduit to generate a violent turbulence immediately downstream of the sloped wall of the frustum facing in the downstream direction, and effecting controlled turbulence downstream of said dispersing member, thereby to provide intimate and homogeneous mixing of the fluids.

2. The device of claim 1 wherein the sloped wall portion of the joined frustums which extends in the upstream direction is longer than the sloped wall portion which extends in the downstream direction.

3. The device of claim 1 wherein the sloped wall of the joined frustums facing in the upstream direction has an angle of from about 39° to about 75° to the plane defined by the periphery of the joined ends of said frustums.

4. The device of claim 3 wherein said angle is in the order of 67.5°.

5. The device of claim 1 wherein the Beta number of said dispersing member in relation to said conduit is from about 0.3 up to about 0.94.

6. The device of claim 1 wherein said fluid dispersing member contains a plurality of passages for discharging the second fluid into the first fluid, said passages opening through said member at the upstream side of said joined frustums.

7. The device of claim 1 wherein said fluid dispersing member contains a plurality of passages for discharging the second fluid into the first fluid, said passages opening through said member at the downstream side of said joined frustums.

8. A fluid mixing device comprising a main tubular conduit of uniform internal configuration for conducting a first fluid therethrough in a predetermined direction, a smaller tubular conduit entering through the wall of said main conduit and turning in the downstream direction of fluid flow through a bend to a downstream end centered axially within said main conduit, such that the center lines of the main conduit and the downstream end of the smaller conduit are coaxial, a mixing element consisting essentially of two frustums joined at their larger ends attached to the downstream end of said smaller conduit within said main conduit such that the axis of symmetry of said mixing element is coaxial with the axes of said main conduit and the downstream end of said smaller conduit, said smaller conduit conducting a second fluid to said mixing element, said mixing element being smaller than said main conduit and larger than said smaller conduit and being mounted with the plane of the joined ends of said frustums substantially perpendicular to the direction of fluid flow through said main conduit and with its periphery spaced outwardly from the downstream end of said smaller conduit and inwardly from said main conduit, the sloped wall of the joined frustums facing in the upstream direction extending outwardly from the downstream end of said smaller conduit to the periphery of said joined frustums at an angle of from about 39° to about 75° to the plane defined by the periphery of the joined ends of said frustums and the sloped wall of the joined frustums facing in the downstream direction extending inwardly from the periphery of said joined frustums to adjacent the axis of said main conduit at an angle in order of about 22° to said plane and terminating in a flat face parallel to said plane and coaxial with said main conduit, said mixing element causing the fluid flowing therearound through said main conduit to generate a violent turbulence immediately downstream of the sloped wall of the frustum facing in the downstream direction, and effecting controlled turbulence downstream of said mixing element, thereby to provide intimate and homogeneous mixing of the fluids.

9. The device of claim 8 wherein the Beta number of said mixing element in relation to said male conduit is from about 0.3 up to about 0.94.

10. The device of claim 8 wherein the downstream end of said smaller conduit has at least one fluid discharge port therein adjacent the upstream side of said mixing element for discharging the second fluid into the first fluid immediately upstream of said mixing element.

11. The device of claim 8 wherein said mixing element contains at least one passage in communication with the downstream end of said smaller conduit and opening through said element at the upstream side of said joined frustums for discharging the second fluid into the first fluid on the upstream side of said joined frustums.

12. The device of claim 8 wherein said mixing element contains at least one passage in communication with the downstream end of said smaller conduit and opening through said element at the downstream side of said joined frustums for discharging the second fluid into the first fluid immediately on the downstream side of said joined frustums.

* * * * *